United States Patent
Schroeder et al.

(10) Patent No.: US 10,207,554 B2
(45) Date of Patent: Feb. 19, 2019

(54) VEHICLE SUSPENSION ASSEMBLY, AND METHODS OF USE AND MANUFACTURE THEREOF

(71) Applicant: Honda Motor Co., Ltd., Tokyo (JP)

(72) Inventors: Dustin M. Schroeder, Milford Center, OH (US); L. Tyler Farrar, Marysville, OH (US); Henry D. Wolf, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 15/462,558

(22) Filed: Mar. 17, 2017

(65) Prior Publication Data

US 2018/0264902 A1 Sep. 20, 2018

(51) Int. Cl.
*B60G 3/18* (2006.01)
*B60G 7/00* (2006.01)
*B60G 7/02* (2006.01)
*B60G 13/00* (2006.01)
*B60G 21/055* (2006.01)

(52) U.S. Cl.
CPC ............... *B60G 3/18* (2013.01); *B60G 7/001* (2013.01); *B60G 7/005* (2013.01); *B60G 7/008* (2013.01); *B60G 7/02* (2013.01); *B60G 13/00* (2013.01); *B60G 21/055* (2013.01)

(58) Field of Classification Search
CPC ........ B60G 3/18; B60G 3/202; B60G 21/055; B60G 2200/14; B60G 2200/144; B60G 2200/1442; B60G 2200/156; B60G 2200/18; B60G 2200/182; B60G 2200/184; B60G 2200/42; B60G 2204/416; B60G 2206/124; B60G 7/001; B60G 7/005; B60G 7/008; B60G 7/02; B60G 13/00
See application file for complete search history.

(56) References Cited

U.S. PATENT DOCUMENTS

| | | | |
|---|---|---|---|
| 5,340,146 A | 8/1994 | Kato | |
| 5,833,026 A * | 11/1998 | Zetterstrom | B60G 3/202 180/360 |
| 7,150,462 B2 | 12/2006 | Bortz et al. | |

(Continued)

FOREIGN PATENT DOCUMENTS

| | | | | |
|---|---|---|---|---|
| DE | 19903435 A1 * | 8/2000 | | B60G 3/20 |
| EP | 0729876 A1 * | 9/1996 | | B60G 3/207 |

*Primary Examiner* — Laura Freedman
(74) *Attorney, Agent, or Firm* — Kenealy Vaidya LLP

(57) ABSTRACT

Some embodiments are directed to a suspension assembly of a vehicle having a frame and an engine. The suspension assembly can include a trailing arm having first and second ends and configured to extend from the frame at the first end. The suspension assembly can further include a knuckle connected to the second end of the trailing arm. The suspension assembly can include an arm assembly configured to extend from the frame to support the knuckle and facilitate translational movement of the knuckle relative to the frame in at least one predetermined direction. The suspension assembly can include a damper and a connecting link configured to extend from the frame and connected to the trailing arm. The suspension assembly can include a stabilizer bar connected to the connecting link and extending rearward around the engine.

20 Claims, 13 Drawing Sheets

(56) References Cited

U.S. PATENT DOCUMENTS

| | | | |
|---|---|---|---|
| 7,654,544 B2* | 2/2010 | Lounsberry | B60G 7/001 |
| | | | 280/124.134 |
| 8,408,568 B2* | 4/2013 | Yanagida | B60G 3/20 |
| | | | 280/124.128 |
| 8,746,719 B2* | 6/2014 | Safranski | B60G 3/14 |
| | | | 280/124.148 |
| 8,764,039 B2 | 7/2014 | Keller et al. | |
| 9,242,672 B2 | 1/2016 | Brady et al. | |
| 9,663,145 B2* | 5/2017 | Schroeder | B62D 21/11 |
| 9,969,240 B2* | 5/2018 | Suzuki | B60G 3/20 |
| 2005/0046136 A1 | 3/2005 | Sutton | |
| 2009/0008890 A1 | 1/2009 | Woodford | |
| 2015/0183285 A1 | 7/2015 | Kettenberger | |
| 2015/0251510 A1 | 9/2015 | Murray | |
| 2016/0185171 A1 | 6/2016 | Suzuki et al. | |
| 2016/0347137 A1* | 12/2016 | Despres-Nadeau | B60G 3/202 |
| 2018/0170135 A1* | 6/2018 | Hisada | B60G 3/26 |

\* cited by examiner

VEHICLE SUSPENSION ASSEMBLY, AND METHODS OF USE AND MANUFACTURE THEREOF

BACKGROUND

The disclosed subject matter relates to a vehicle suspension assembly, and methods of use and manufacture thereof. More particularly, the disclosed subject matter relates to methods and apparatus for a vehicle suspension assembly that can achieve high roll stiffness while maintaining a shorter wheelbase in light of packaging restraints.

Vehicle suspension assemblies, particularly assemblies for four-wheeled vehicles, can include a suspension system for each wheel of the vehicle. Each of the front wheels can be connected to the vehicle by a respective independent suspension system (for example, a system that includes a wishbone configuration). The rear wheels can be similarly connected to the vehicle. A suspension system can include a knuckle, a wheel hub connected to the knuckle and rotatably supporting a wheel, at least one link movably connecting the knuckle to the vehicle, a damper connected to the link or to the knuckle, and a stabilizer bar. These components can be arranged in a plurality of different configurations in order to provide varied suspension stroke ranges and roll stiffness while offering different levels of ride comfort, dynamic performance, vehicle weight, etc.

SUMMARY

According to one aspect, a suspension assembly of a vehicle having a frame, an engine and at least one driven wheel is provided, the vehicle being drivable in forward and rearward directions. The suspension assembly can include a trailing arm having first and second ends and configured to extend from the frame at the first end. The suspension assembly can also include a knuckle connected to the second end of the trailing arm and configured to support the at least one wheel. The suspension assembly can also include an arm assembly configured to extend from the frame to support the knuckle and facilitate translational movement of the knuckle relative to the frame in at least one predetermined direction. The suspension assembly can also include a damper configured to extend from the frame and connected to the trailing arm. The suspension assembly can also include a connecting link connected to the trailing arm rearward of the damper. The suspension assembly can also include a stabilizer bar connected to the connecting link and extending rearward around the engine.

According to another aspect, a vehicle having an engine and at least one driven wheel is provided, the vehicle being drivable in forward and rearward directions. The vehicle can include a frame assembly and a suspension assembly. The suspension assembly can include a trailing arm having first and second ends and configured to extend from the frame at the first end. The suspension assembly can also include a knuckle connected to the second end of the trailing arm and configured to support the at least one wheel. The suspension assembly can also include an arm assembly configured to extend from the frame to support the knuckle and facilitate translational movement of the knuckle relative to the frame in at least one predetermined direction. The suspension assembly can also include a damper configured to extend from the frame and connected to the trailing arm. The suspension assembly can also include a connecting link connected to the trailing arm rearward of the damper.

According to yet another aspect, a suspension assembly of a vehicle defining a vehicle body and having an engine can be provided. The suspension assembly can include a knuckle supporting a wheel. The suspension assembly can include a trailing arm extending rearward from the vehicle body and connected to the knuckle. The suspension assembly can include an upper arm extending in a vehicle width direction from the vehicle body and connected to the knuckle. The suspension assembly can include a lower arm extending in the vehicle width direction from the vehicle body and connected to the knuckle below the upper arm. The suspension assembly can include a control arm extending both rearward and in the vehicle width direction from the vehicle body, arranged above the trailing arm and connected to the knuckle. The suspension assembly can include a damper extending downward from the vehicle body and connected to the trailing arm. The suspension assembly can include a stabilizer bar connected to the trailing arm and extending in the vehicle width direction behind the engine.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
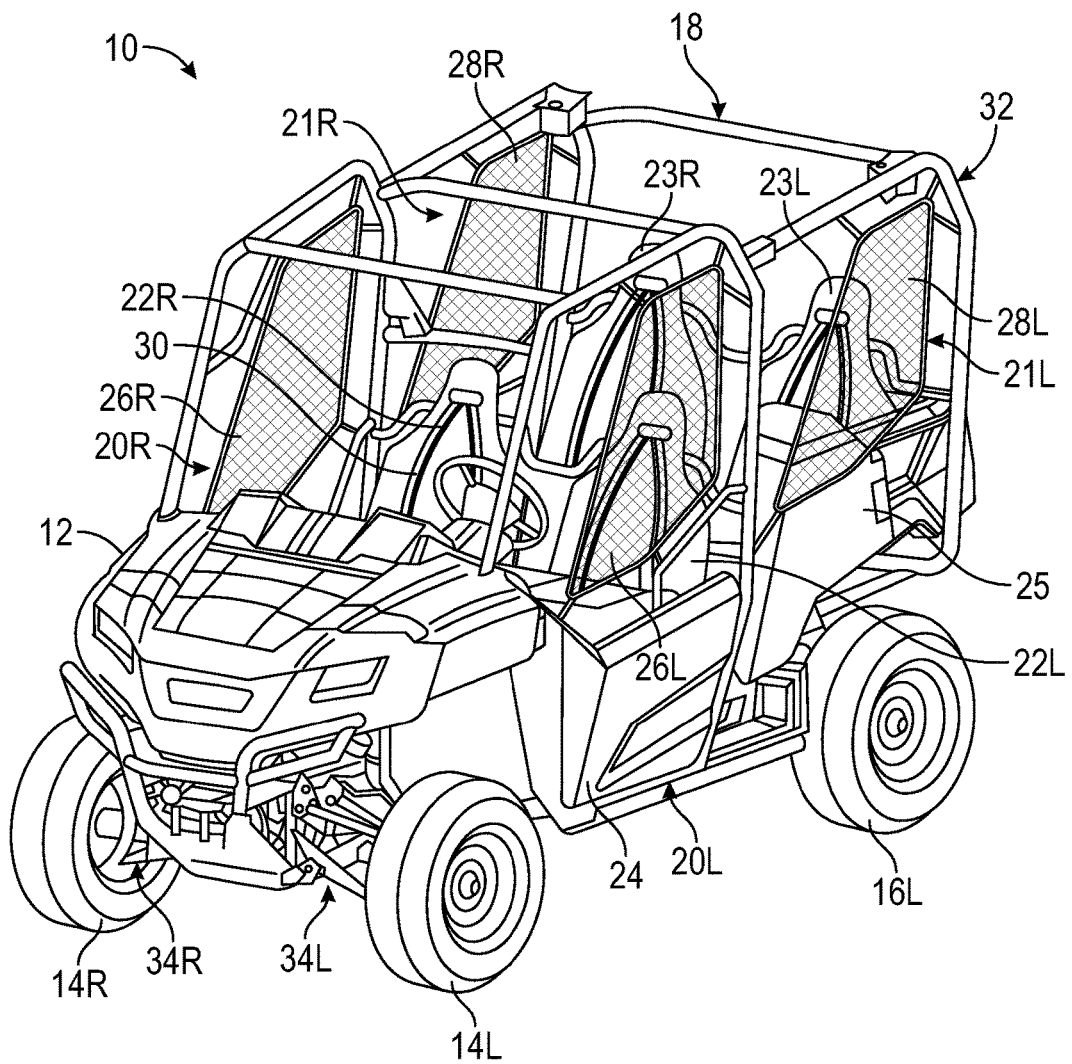
FIG. 1 is a perspective view of an exemplary vehicle including a frame in accordance with the disclosed subject matter.

FIG. 1 illustrates an embodiment of a vehicle 10 that can include a frame and suspension assembly made in accordance with the principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV).

However, the disclosed suspension assembly can be used with any vehicle that is configured for travel along any one or combination of improved, unimproved, and unmarked paths. For example, embodiments are intended to include or otherwise cover any type of vehicle or automobile, including a passenger car, minivan, truck, other types of all-terrain vehicles (ATV), semi-tractor, off-highway vehicle, etc. In fact, embodiments are intended to include or otherwise cover configurations of the suspension assembly for use in still other types of vehicles, such as an autonomous wheeled vehicle, a non-motorized wheeled vehicle, a continuous tracked vehicle (such as but not limited to a military tank, bulldozer, and farm tractor), etc.

The vehicle 10 can include a body 12, a pair of front wheels, 14L, 14R, a pair of rear wheels 16L, 16R, a roll cage 18, a pair of front door assemblies 20L, 20R, a pair of rear door assemblies 21L, 21R, a frame assembly 32, a pair of front suspension assemblies 34L, 34R, a pair of rear suspension assemblies and a powertrain. The right rear wheel 16R, the rear suspension assemblies and the powertrain are hidden from view in FIG. 1 by the body 12. The frame assembly 32 can include the roll cage 18. As will be discussed in detail below, the suspension assemblies can be configured to include four links/arms to accommodate large suspension strokes while working around the packaging concerns. Thus, the packaging of the suspension assemblies can enable a stabilizer bar to be placed behind the engine for roll stiffness while avoiding lengthening the wheelbase.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly 32 to define a pair of door openings through which a passenger may pass in order to enter or exit the passenger area.

The front door assemblies 20L, 20R can each include a door 24 and a front window panel assembly 26L, 26R, and can be configured to selectively open and close access through the door openings by moving between a closed position and a fully opened position. The rear door assemblies 21L, 21R can each include a door 25 and a rear window panel assembly 28L, 28R, and can be configured to selectively open and close access through the door openings by moving between a closed position and a fully opened position. In the closed position, the door assemblies 20L, 20R, 21L, 21R can span the respective door openings to obstruct access to the passenger area via the door openings. In the closed position, the front portion of each door assembly 20L, 20R, 21L, 21R can be latched to the roll cage 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position. The exemplary window panel assemblies 26L, 26R, 28L, 28R are illustrated to include a mesh of net. However, embodiments are intended to include or otherwise cover window panel assemblies that include a transparent or semi-transparent panel.

Each seat 22L, 22R, 23L, 23R of the vehicle 10 also can include a vehicular seat belt assembly 30, and/or other structures that may be relevant or beneficial.

II. Suspension Assembly

As will be discussed in detail below, the frame assemblies can include a plurality of mounting locations configured to provide attachment points for elements of configurations of the exemplary suspension assemblies. Each suspension assembly can include any appropriate combination of a wheel hub, a knuckle, a damper (also referred to as a shock absorber or cushion), a stabilizer bar (also referred to as an anti-roll bar) and at least one arm (also referred to as a link). The at least one link can be movably connected to each of the knuckle and one of the plurality of mounting locations.

The suspension assembly can incorporate a wishbone (also referred to as an A-arm) suspension assembly and a multi-link suspension assembly having a plurality of links of any number and orientation. In the exemplary embodiments, the frame assembly can include mounting locations for a configuration of a suspension assembly that can be referred to as a 4-link suspension assembly, as shown in FIGS. 2, 16-17 and 19-20

FIGS. 2, 16 and 19-20 illustrate the left side of the frame assembly of the vehicle, and features of exemplary left suspension configurations. It is to be understood that the right side of the frame assembly of the vehicle, and the right suspension configurations can be configured as mirror images of the left side of the frame assembly and the left suspension configurations shown in FIGS. 2, 16 and 19-20.

Figure 2:
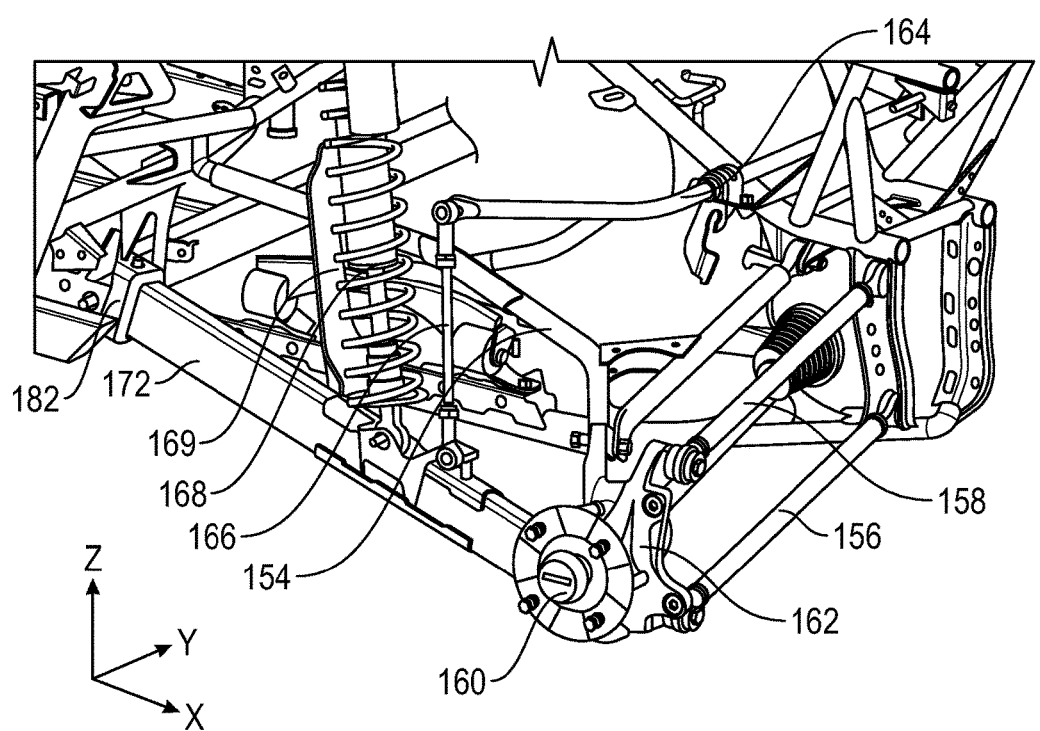
FIG. 2 is a perspective view of a suspension assembly of the vehicle of FIG. 1.

FIG. 2 shows a configuration of the suspension assembly connected to the frame assembly 32 at the left rear of the vehicle 10. The configuration of a suspension assembly shown can be referred to as a 4-link suspension assembly. The 4-link suspension assembly can include a plurality of arms 154, 156, 158 and 172 totaling four, a wheel hub 160, a knuckle 162, a stabilizer bar 164, a connecting link 166, and a damper 168.

The links 154, 156, 158 and 172 can be configured as an upper A-arm 154, a lower lateral link 156 and an upper lateral link 158, and a trailing arm 172. The knuckle 162 can be connected to the wheel hub 160. The wheel hub 160 can rotatably support the left rear wheel 16L and the left rear brake on the knuckle 162. The knuckle 162 can include a plurality of mounting fixtures, one for each of the upper A-arm 154, the lower lateral link 156 and the upper lateral link 158, and the trailing arm 172.

Figure 5:
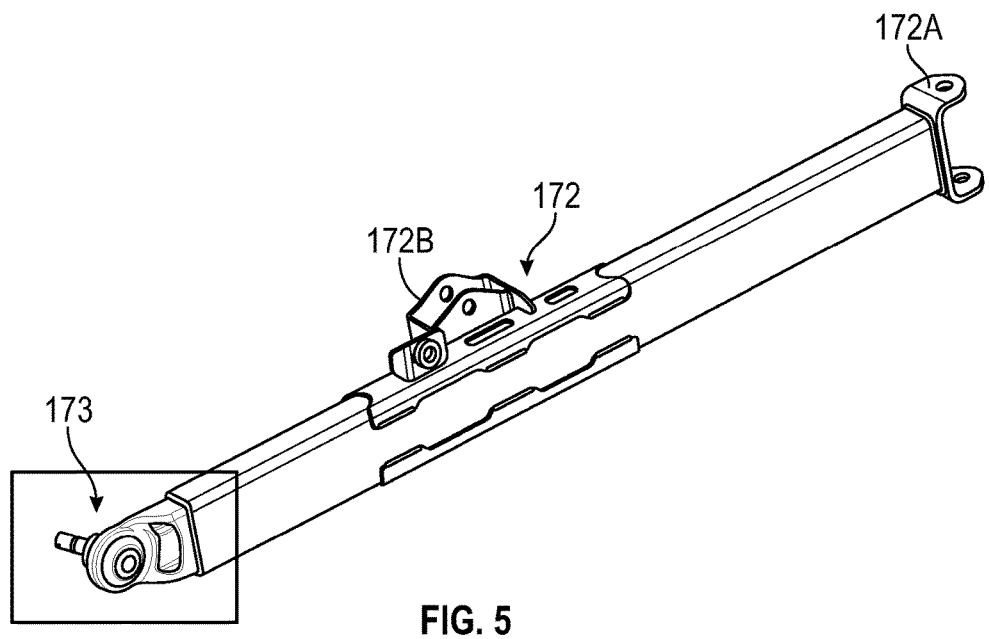
FIG. 5 is a perspective view of the trailing arm of FIG. 4 including a ball joint in accordance with the disclosed subject matter.
Figure 6:
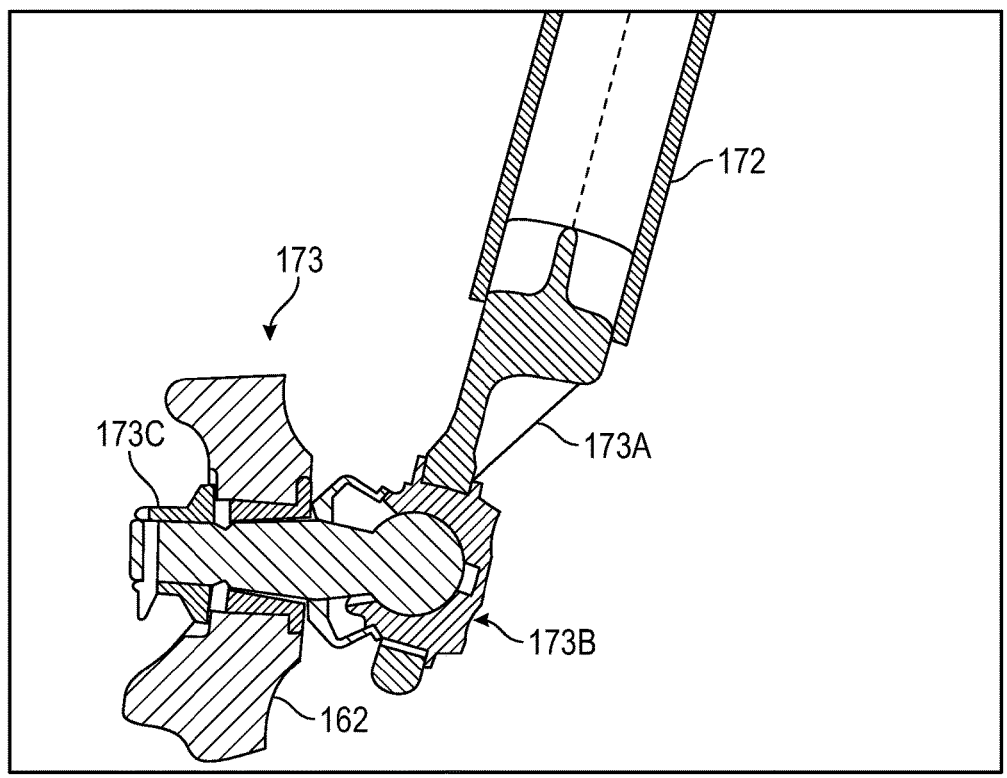
FIG. 6 is cross-section view of the ball joint of the trailing arm of FIG. 5 connected to a knuckle in accordance with the disclosed subject matter.
Figure 7:
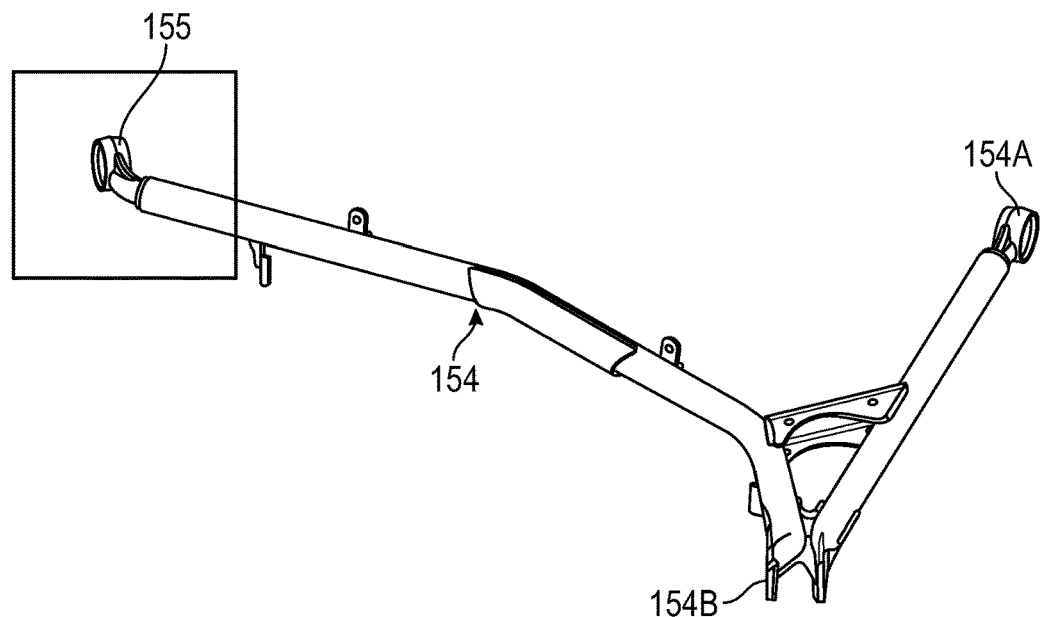
FIG. 7 is a perspective view of an upper A-arm of the suspension assembly in accordance with the disclosed subject matter.

The trailing arm 172 can extend from a mounting location on the frame to the knuckle 162 generally in the longitudinal direction X. As shown in FIG. 5, the trailing arm 172 can be a substantially straight section of tubing having a substantially rectangular cross-section, with a frame end 172A, an intermediate bracket 172B, and a knuckle end 173. The trailing arm 172 can be connected to the knuckle 162 in any appropriate manner, such as but not limited to a mechanical fastener (with or without) bushings that can permit movement of the trailing arm 172 relative to the knuckle 162, as will be described in more detail below. The trailing arm 172 can be connected to the frame assembly 32 at the respective mounting location in any appropriate manner, such as but not limited to mechanical fasteners (with or without bushings) that can permit at least one degree of freedom of movement of the trailing arm 172 relative to the frame assembly 32, as will be described in more detail below. As shown in FIG. 6, the trailing arm 172 of the present embodiment can incorporate a ball joint or a spherical joint 1738 in the knuckle end 173 to connect the trailing arm 172 to the knuckle 162 via a nut 173C (i.e., a castle nut). A lower arm tube of the trailing arm 172 can include arm forging/casting 173A extending therefrom, the ball joint 1738 being positioned on the arm forging/casting 173A. Other configurations of the knuckle end 173 of the trailing arm 172 can be implemented that provide multidirectional rotation of the knuckle 162 relative to the trailing arm 172.

Figure 3:
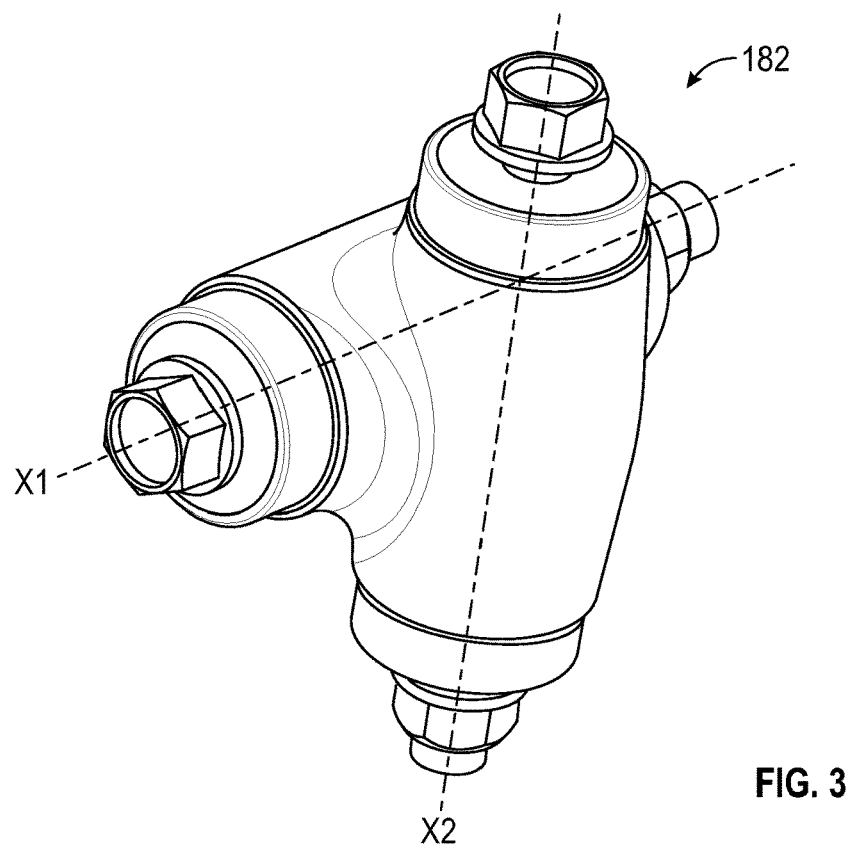
FIG. 3 is a perspective view of a pivot assembly that can connect a trailing arm of a suspension assembly to the frame in accordance with the disclosed subject matter.
Figure 4:
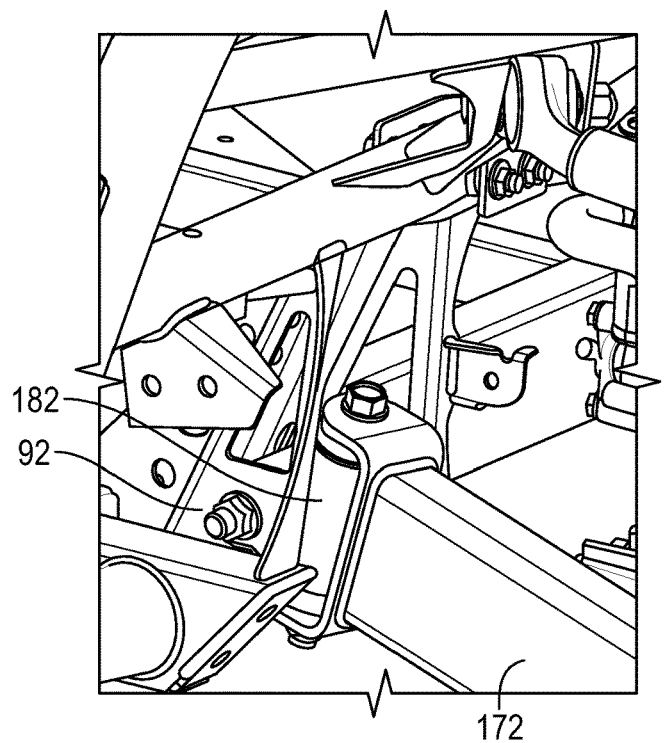
FIG. 4 is a perspective view of the pivot assembly of FIG. 3 connecting the trailing arm to the frame.

FIG. 4 shows the trailing arm 172 connected to the respective mounting fixture (i.e., a frame bracket 92) by a pivot assembly 182 that can provide multiaxial rotation between the frame bracket 92 on the frame assembly 32 and the trailing arm 172. The pivot assembly 182 impedes the trailing arm 172 from rotating about the vehicle X-axis from wheel and damper loads. Specifically, the pivot assembly 182 shown in FIG. 3 can facilitate rotation about X1 and X2 of the trailing arm 172 relative to the frame assembly 32. The pivot assembly 182 of the present embodiment can have offset axes X1 and X2 such that the vertical axis X2 is positioned rearward of the horizontal axis X1. The offset can be, for example, 23 mm between the axes X1 and X2, however any appropriate degree of offset is possible. The pivot assembly 182 can be bolted to holes formed in the respective mounting fixture.

The lower lateral link 156 can extend from a mounting location on the frame assembly 32 to the knuckle 162 generally in the transverse direction Y. FIGS. 2, 10, 16 and 19-20 show that the lower lateral link 156 can be bolted to the respective mounting fixture via holes formed in the mounting fixture. The mounting fixture can be configured as a mounting bracket that is secured to the frame with mechanical fastener(s), welding, adhesives or any another appropriate manner. Embodiments are intended to include the lower lateral link 156 connected to the respective mounting fixture and to the knuckle 162 in any appropriate manner, such as but not limited to mechanical fasteners (with or without bushings) that can permit at least one degree of freedom of movement of the lower lateral link 156 relative to each of the frame assembly 32 and the knuckle 162.

The upper lateral link 158 can extend from a mounting location on the frame assembly 32 to the knuckle 162 generally in the transverse direction Y. FIGS. 2, 10, 16 and 19-20 show that the upper lateral link 158 can be bolted to the respective mounting fixture via holes formed in a respective frame bracket. Embodiments are intended to include the upper lateral link 158 connected to the respective mounting fixture and to the knuckle 162 in any appropriate manner, such as but not limited to mechanical fasteners (with or without bushings) that can permit at least one degree of freedom of movement of the upper lateral link 158 relative to each of the frame assembly 32 and the knuckle 162.

Figure 13:
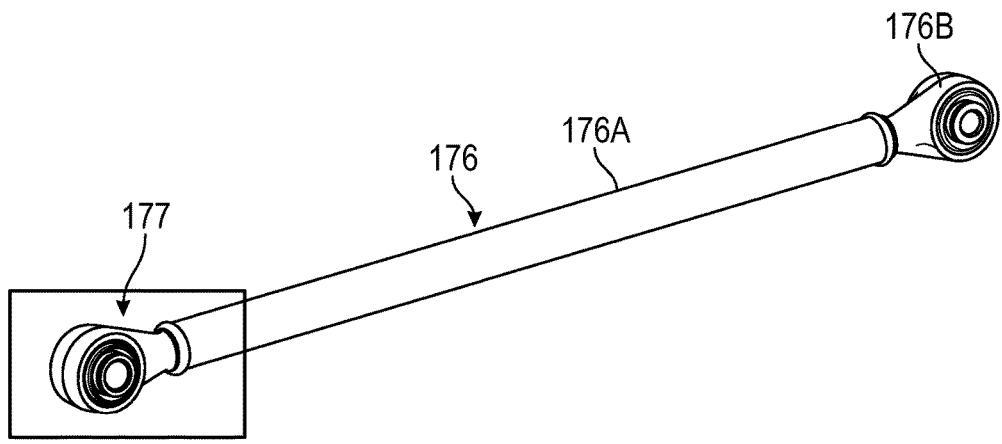
FIG. 13 is a perspective view of the lateral arm such as upper or lower lateral links in accordance with the disclosed subject matter.
Figure 14:
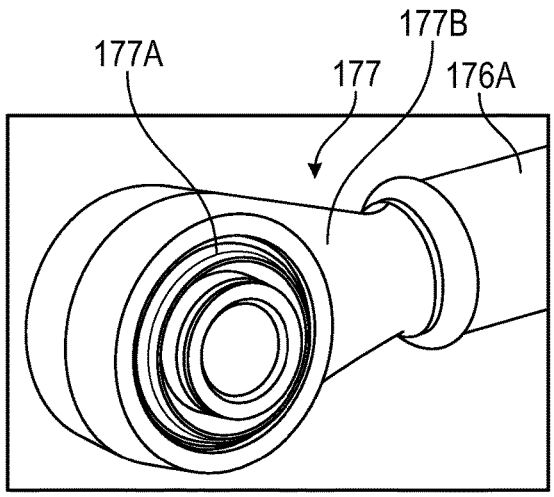
FIG. 14 is an enlarged perspective view of a spherical joint of the lateral arm of FIG. 13 in accordance with the disclosed subject matter.
Figure 15:
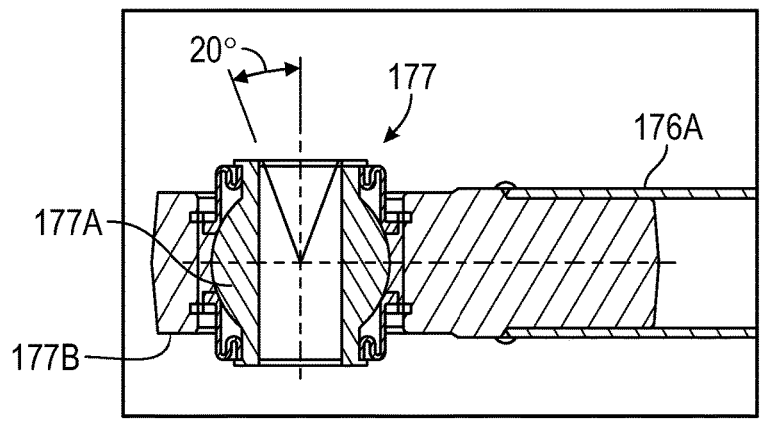
FIG. 15 is a cross-section view of the spherical joint of the lateral arm of FIG. 14 in accordance with the disclosed subject matter.
Figure 16:
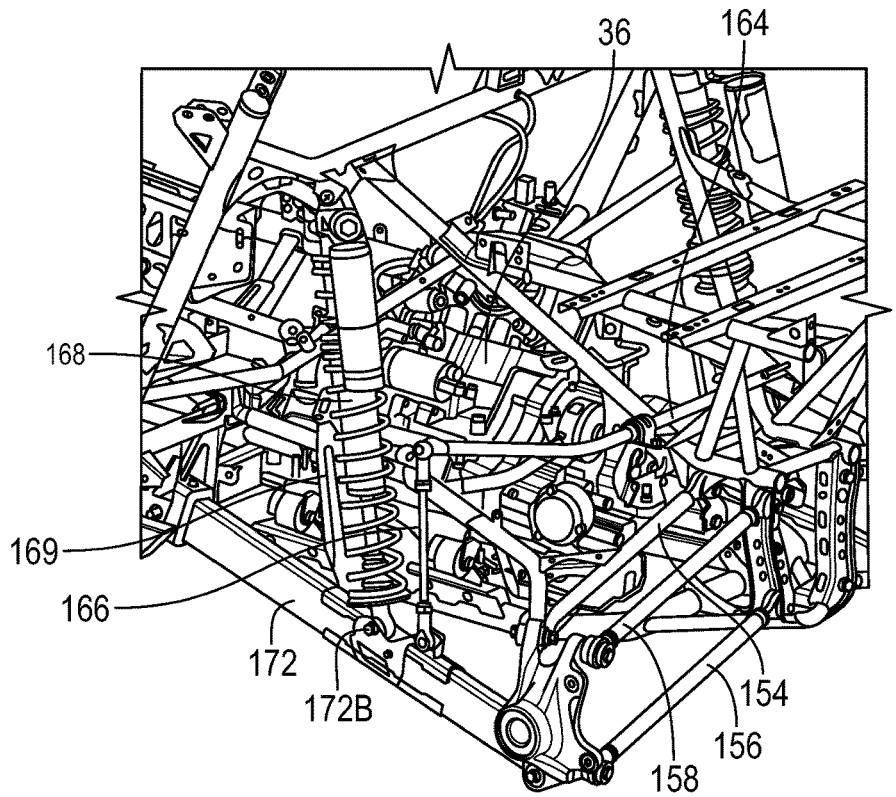
FIG. 16 is a perspective view of the suspension assembly of the vehicle including an engine in accordance with the disclosed subject matter.
Figure 17:
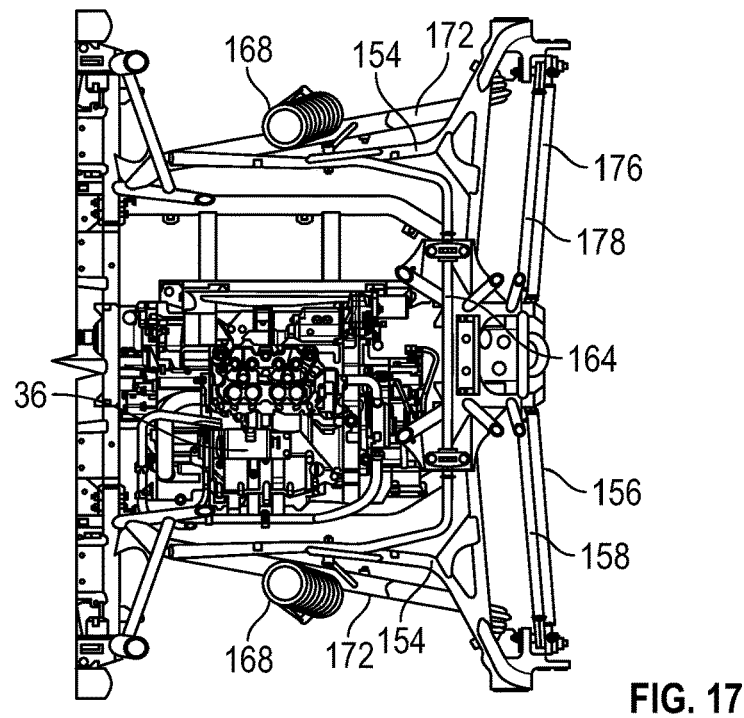
FIG. 17 is a top perspective view of the suspension assembly of the vehicle of FIG. 16 in accordance with the disclosed subject matter.

As shown in FIGS. 13-15, embodiments of lateral links 176, 178 represent right-side components mirroring the lateral links 156, 158 and can have link bodies 176A formed as elongated tubes have booted spherical bearings 177A (also referred to as ball joints) on both a frame end 1768 and a knuckle end 177. The spherical bearings can be held by corresponding forged bearing holders 177B on each end of the lateral link. The forged bearing holder 1778 can be welded to the link body 176A. In some embodiments, the spherical bearings 177A can allow for 20 degrees of tilting in all directions. However, other tilt degrees may be appropriate for other embodiments. Additionally, the spherical bearings 177A can be retained in the forged bearing holder 1778 by snap rings, for example two of the snap rings in the present embodiment. Other embodiments can incorporate fewer or additional amounts of snap rings, and may even include other retention hardware besides snap rings. All aforementioned and subsequent descriptions of both pairs of the lateral links 176, 178 and 156, 178 are equally applicable to one another as the right and left-side components are substantially identical.

As shown in FIG. 2, the upper A-arm 154 can extend from a pair of mounting locations on the frame assembly 32 to the knuckle 162 generally in both the longitudinal direction X and the transverse direction Y. FIGS. 7-12 show the upper A-arm 154 can be bolted to the respective mounting fixtures via holes formed in the mounting fixture. Embodiments are intended to include the upper A-arm 154 connected to the respective mounting fixtures and to the knuckle 162 in any appropriate manner, such as but not limited to mechanical fasteners (with or without bushings) that can permit at least one degree of freedom of movement of the upper A-arm 154 relative to each of the frame assembly 32 and the knuckle 162. Specifically, in the present embodiment the upper A-arm 154 can include a pair of diverging legs, connected at intermediate portions by a crossmember, extending from a knuckle end 154B to frame ends 154A, 155. The legs of the upper A-arm 154 can be elongated tubes extending from a knuckle end 154B to frame ends 154A, 155. The frame ends 154A, 155 can be cast or forged housings with spherical joints. The knuckle end 154B can be a formed sheet and tube clevis.

Figure 8:
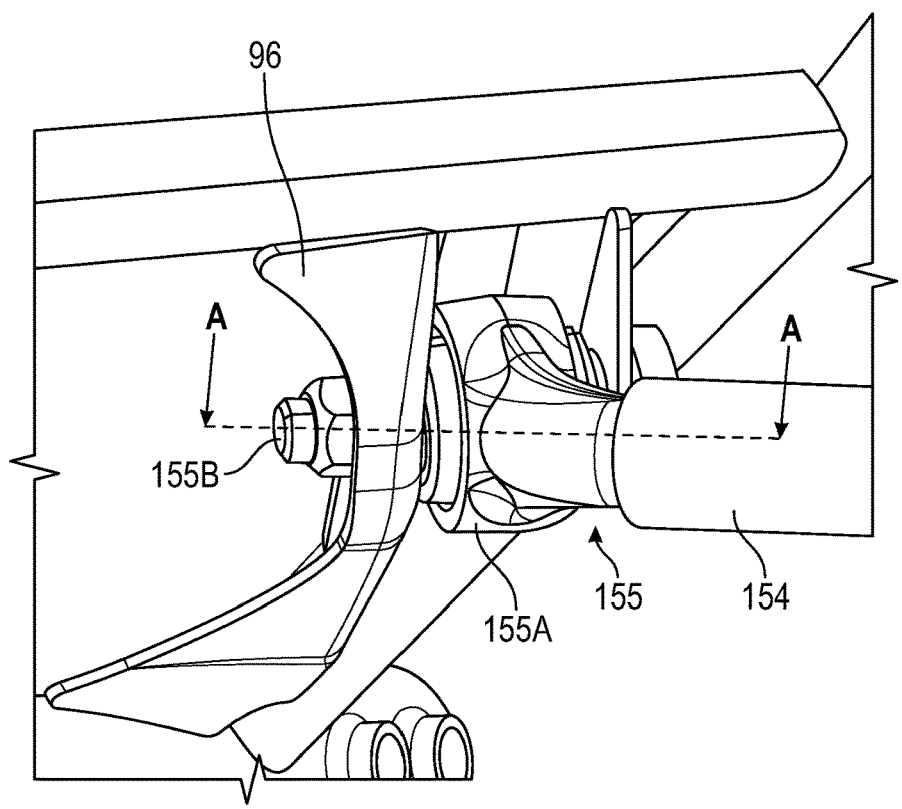
FIG. 8 is a perspective view of the upper A-arm of FIG. 7 connected to the frame by a spherical joint in accordance with the disclosed subject matter.
Figure 9:
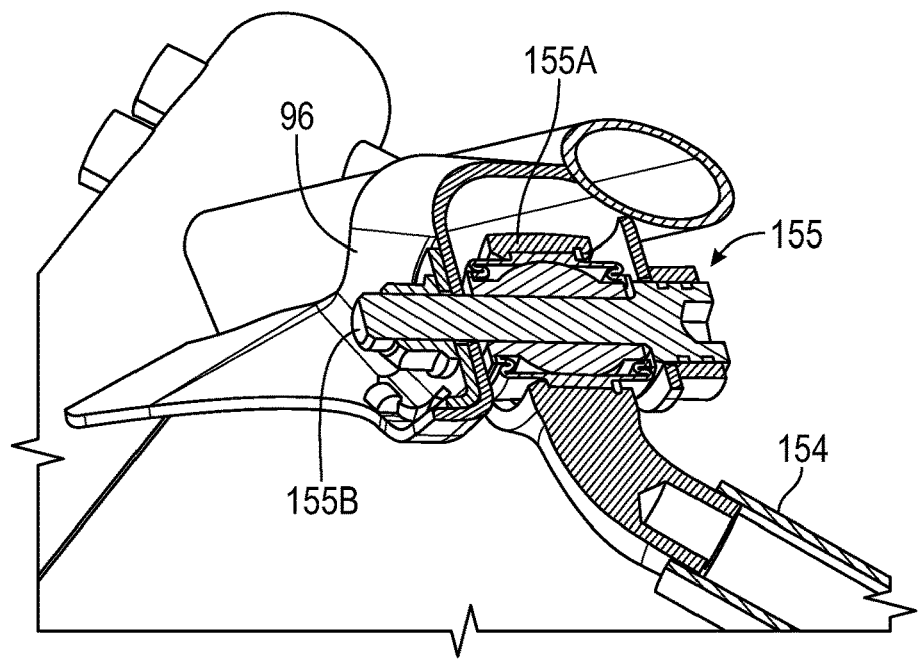
FIG. 9 is a cross-section view of the spherical joint of the upper A-arm of FIG. 8 in accordance with the disclosed subject matter.
Figure 10:
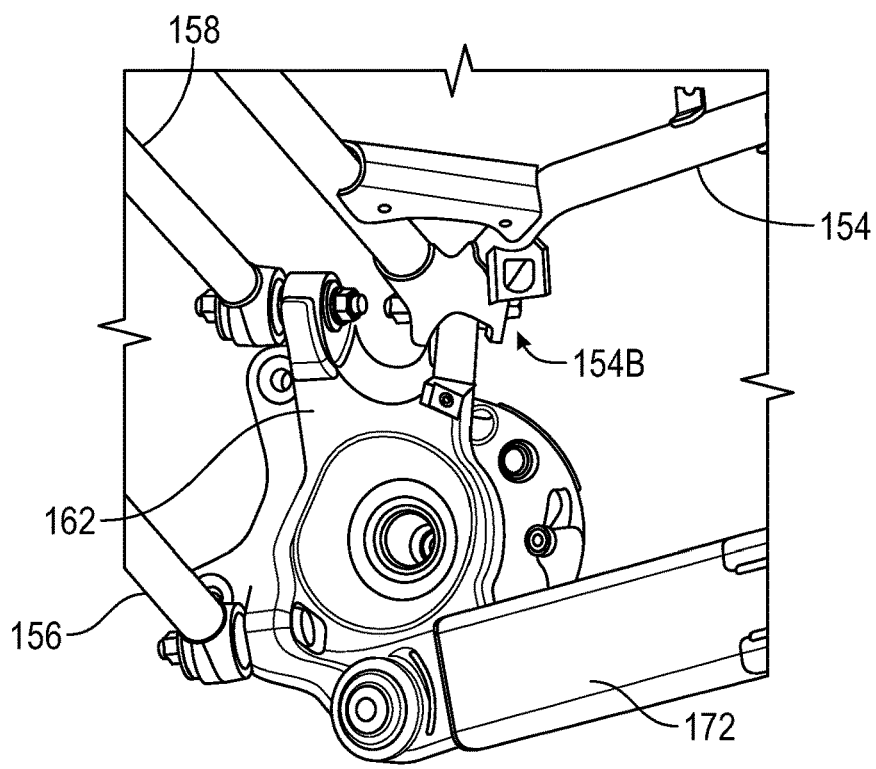
FIG. 10 is a perspective view of an interior side of the knuckle connected to the trailing arm, the upper A-arm, and lateral arms in accordance with the disclosed subject matter.
Figure 11:
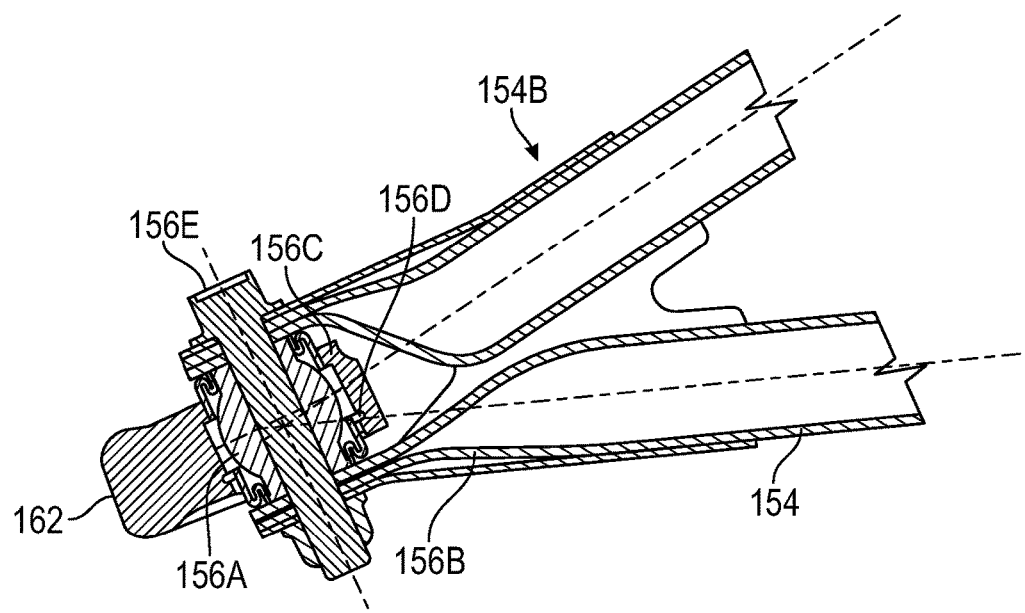
FIG. 11 is a cross-section view of the upper A-arm connected to the knuckle of FIG. 10 in accordance with the disclosed subject matter.
Figure 12:
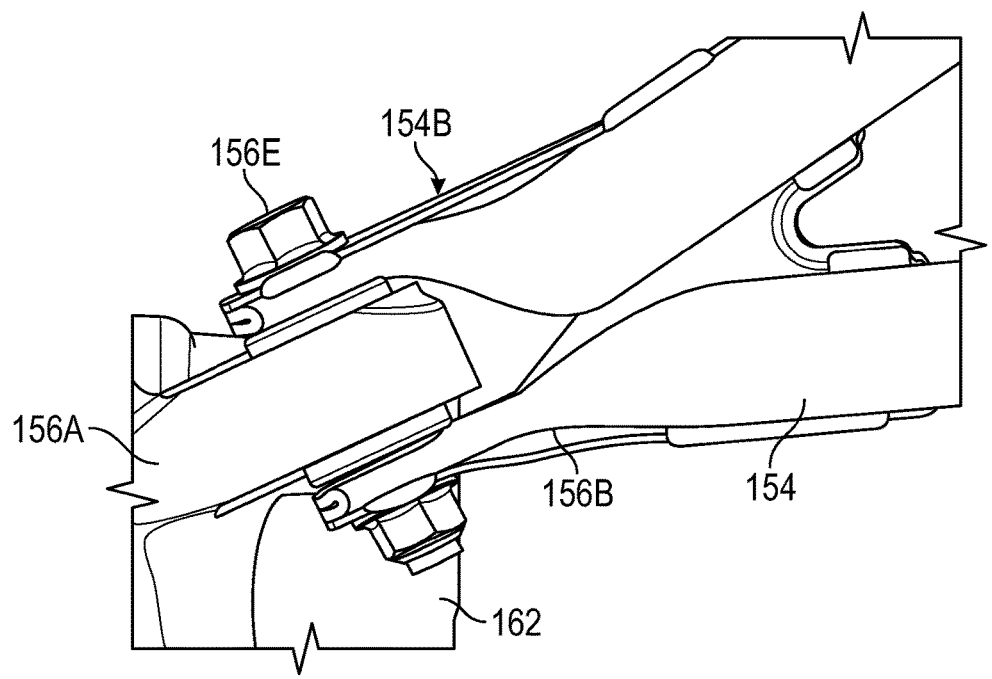
FIG. 12 is an enlarged perspective view of the upper A-arm connected to the knuckle of FIG. 11 in accordance with the disclosed subject matter.

As shown in FIGS. 8 and 9, the frame end 155 of the upper A-arm 154 can have bolts 155B inserted therethrough to secure the spherical joint of the cast or forged housing 155A between a pair of ears on a frame bracket, specifically in a toe bracket 96. FIGS. 10-12 show the upper A-arm 154 connected to the knuckle 162 at a mounting point forward of the other links/arms 176, 178 and 172 also connected to the knuckle 162 in a direction of forward travel of the vehicle 10. Particularly, FIGS. 11 and 12 show the knuckle end 154B attachment structure to the knuckle 162, including a clevis 156B formed from flattening tube body portions of the upper A-arm knuckle end 154B. The knuckle end 154B includes a machined shoulder 156C and clips 156D adjacent a spherical bearing 156A, with or without an integral boot, brought into contact with a bracket protrusion of the knuckle 154B. A bolt 156E can be inserted therethrough to connect the clevis 156B to the knuckle 162.

Figure 18:
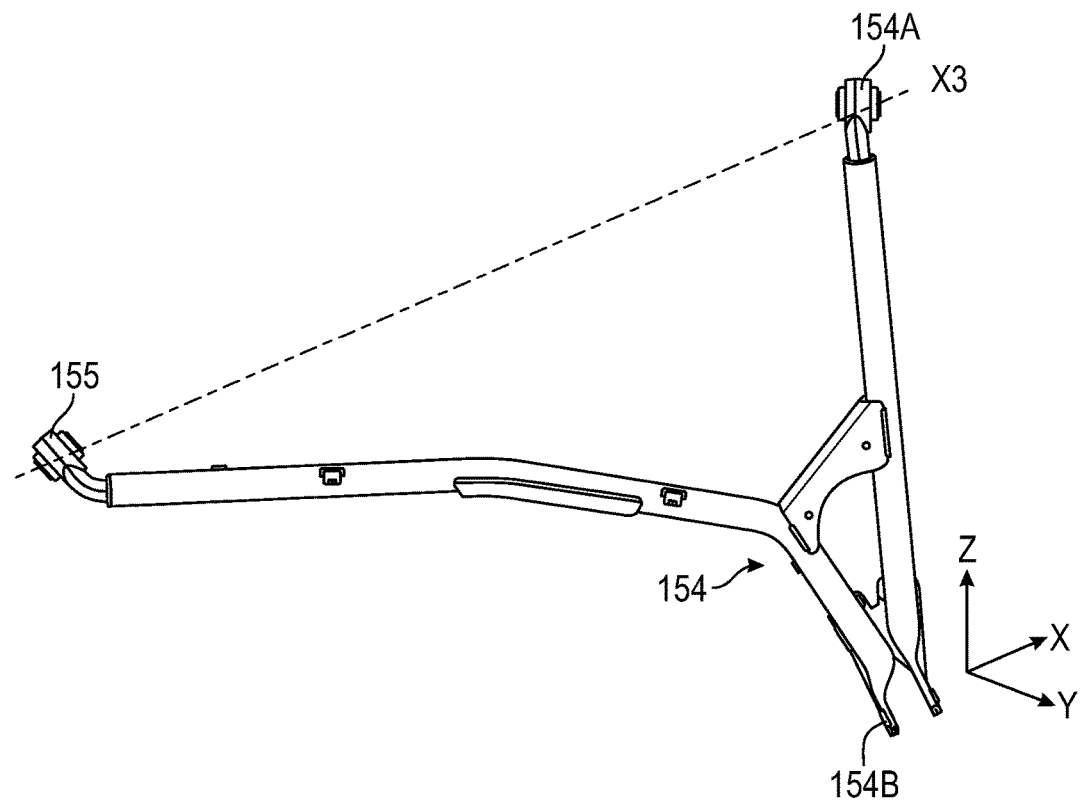
FIG. 18 is a perspective view of the upper A-arm of the suspension assembly in accordance with the disclosed subject matter.
Figure 19:
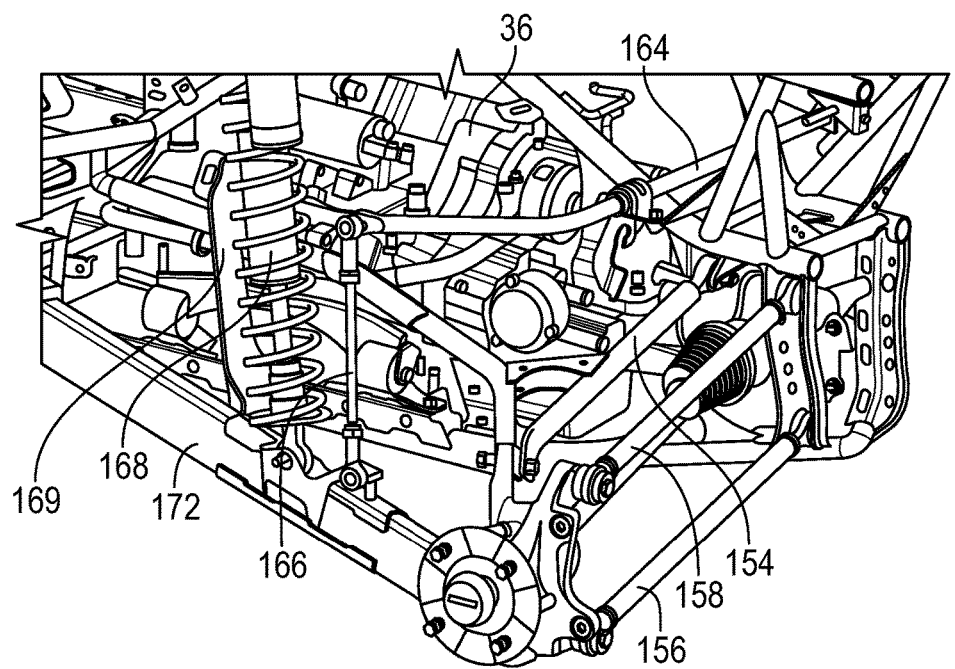
FIG. 19 is a perspective view of the suspension assembly of the vehicle including the engine in accordance with the disclosed subject matter.
Figure 20:
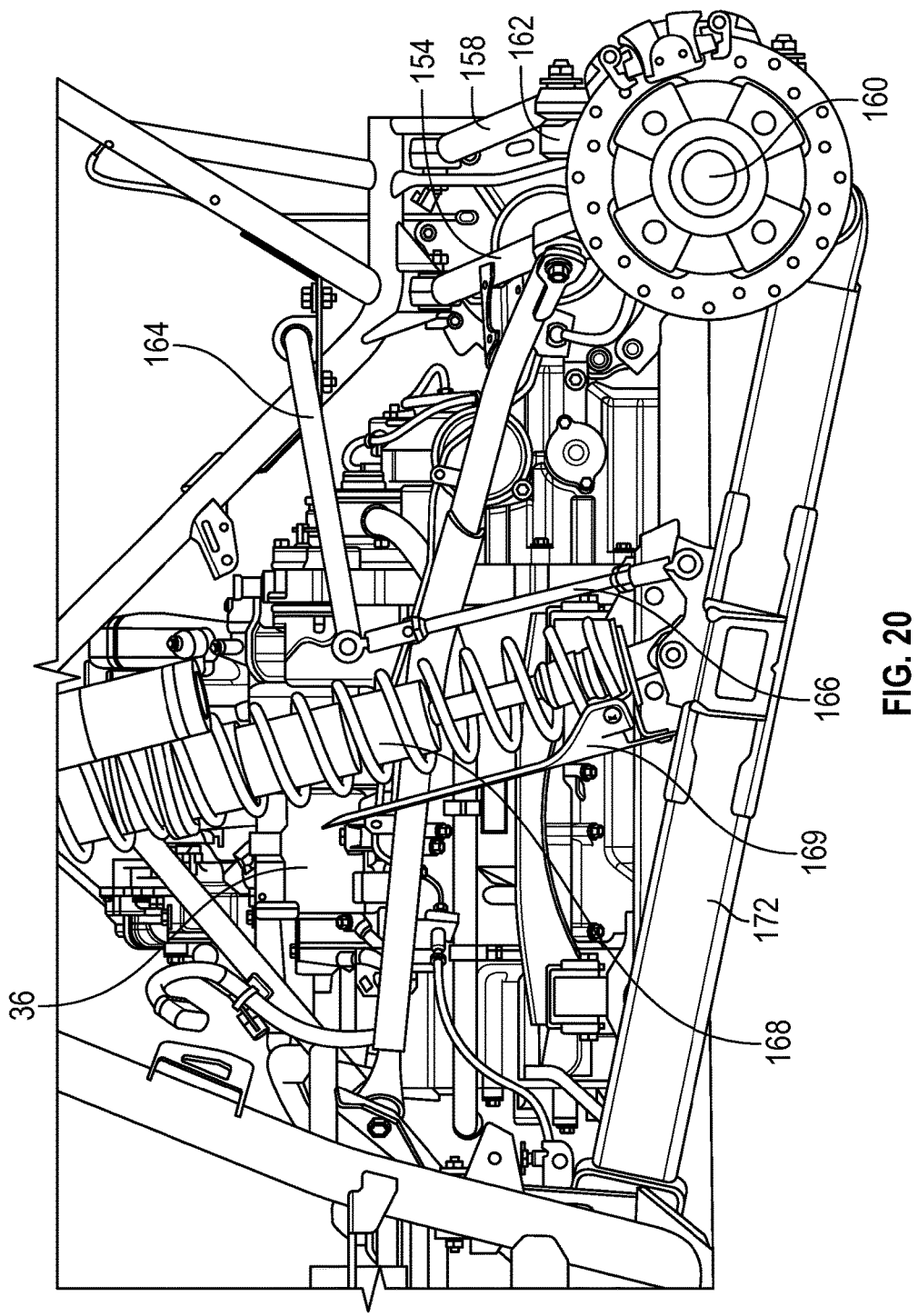
FIG. 20 is a side perspective view of the suspension assembly of the vehicle including the engine in accordance with the disclosed subject matter.

As shown in FIG. 18, in some embodiments the upper A-arm 154 is not parallel to a center of the vehicle 10 such that respective axes of front and rear joints (i.e., frame ends 154A, 155) are not parallel to each other or an axis X3 of the upper A-arm 154. This configuration allows for packaging around the engine 36.

As shown in FIGS. 16-17 and 19-20, the stabilizer bar 164 can be connected to the frame assembly 32 at a mounting location. The connecting link 166 can connect the left end of the stabilizer bar 164 to the trailing arm 172. Specifically, the connecting link 166 can extend upward from the trailing arm 172 behind the damper 168 and engine 36. In the present embodiment, the damper 168 and the connecting link 166 can share a common lower mount and both be connected to the intermediate bracket 172B.

The stabilizer bar 164 can extend in the transverse direction Y from the left rear suspension assembly to the right rear suspension assembly rearward of the engine 36 of the vehicle 10. The stabilizer bar 164 is disposed behind the engine 36 to maintain a shortened wheelbase of the vehicle 10 while achieving high rear roll stiffness with lower reaction loads of the stabilizer bar 164, which in turn equates to less weight and better rear weight bias of the vehicle 10. The stabilizer bar 164 can be connected to the respective mounting location positioned on the right side of the frame assembly 32. Another connecting link can connect the right end of the stabilizer bar 164 to the trailing arm 172 of the right rear suspension system. Because the stabilizer bar 164 is connected to the trailing arms of both rear suspensions assemblies, the stabilizer bar can limit roll of the frame assembly 32 about the longitudinal axis of the vehicle 10.

The damper 168 can include a coil spring and a shock absorber or shock extending inside of the coil spring. The damper 168 can extend from the respective mounting location on the frame assembly 32 to the trailing arm 172. The damper 168 can be connected to the respective mounting fixture and to the intermediate bracket 172B provided on the trailing arm 172 in any appropriate manner, such as but not limited to mechanical fasteners (with or without bushings) that can permit at least two degrees of freedom of movement of the damper 168 relative to each of the frame assembly 32 and the trailing arm 172. In the present embodiment, a damper shield 169 may be positioned adjacent and forward of the damper 168 to protect a front side of the damper 168 from debris during operation of the vehicle 10. However, other embodiments of the suspension system may not include the damper shield 169.

Although illustrated embodiments show the damper 168 connected to an upper portion of the trailing arm 172, exemplary embodiments are intended to include or otherwise cover the damper 168 connected to any appropriate suspension member, such as but not limited to the knuckle 162, the lower portion of the trailing arm 172, or the upper A-arm 154.

The vehicle 10 can include a power source and a transmission configured to drive the front wheels 14L, 14R and/or the rear wheels 16L, 16R. The power source and the transmission can be mounted on the frame assembly 32. In the exemplary embodiments of FIGS. 1-26, the power source can be connected to the frame assembly 32 at a position between front wheels 14L, 14R and the rear wheels 16L, 16R. In this exemplary embodiment, the stabilizer bar 164 can extend in the transverse direction Y at a location rearward of the power source. However, exemplary embodiments are intended to include or otherwise cover a stabilizer bar that can extend in the transverse direction Y at any appropriate location in the longitudinal direction X relative to the power source, such as but not limited to a location forward of the power source or a location above the power source.

III. Additional Designs

Figure 21:
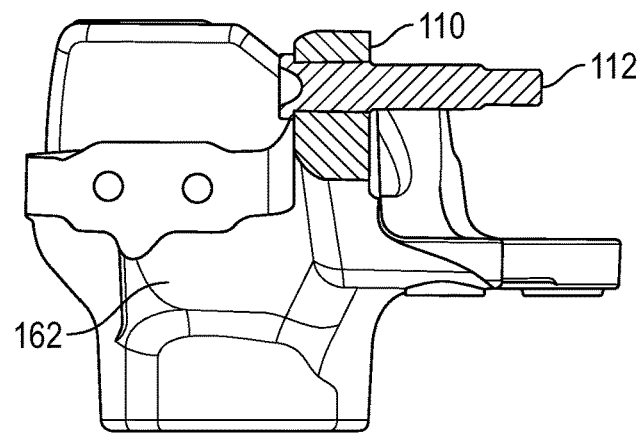
FIG. 21 is a perspective view of an embodiment of the knuckle with a pivot shaft inserted in accordance with the disclosed subject matter.
Figure 22:
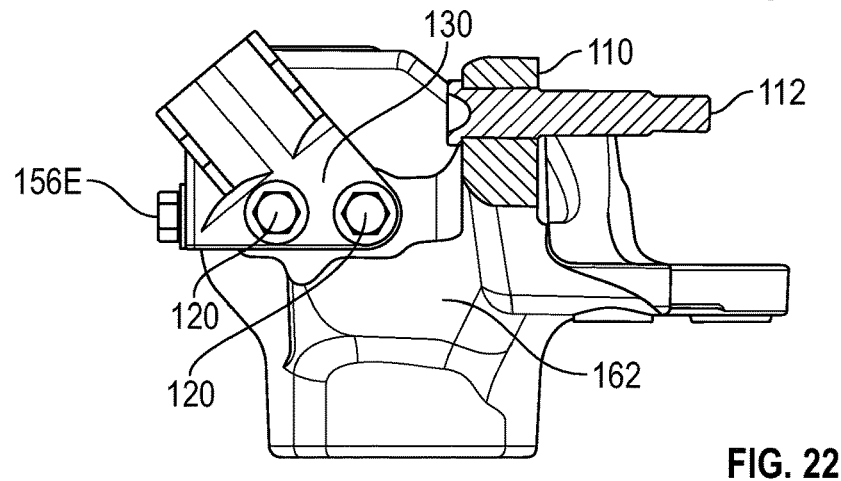
FIG. 22 is a perspective view of the knuckle of FIG. 21 with an upper arm bracket attached in accordance with the disclosed subject matter.
Figure 23:
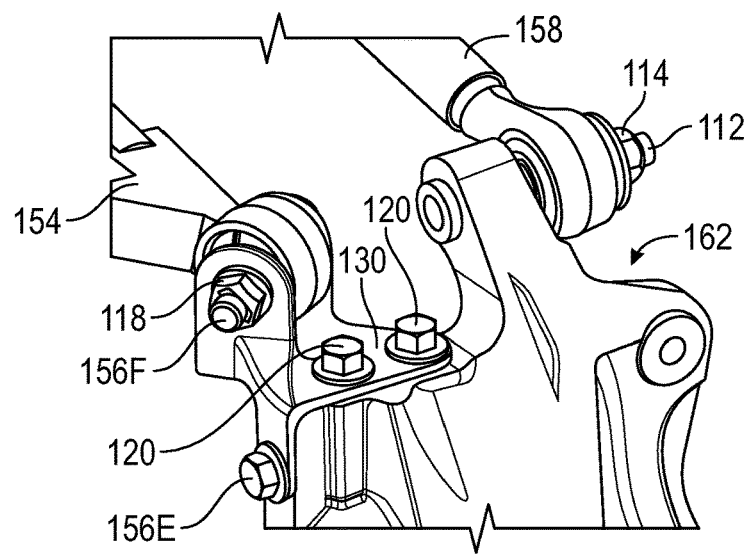
FIG. 23 is a perspective view of the knuckle of FIG. 22 with the upper A-arm and lateral arm connected in accordance with the disclosed subject matter.

As shown in FIGS. 21-23, attachment between the knuckle 162 and either of the lateral links 156,158/176,178 can include a press fit to transmit road loads to suspension members, such as the lateral links 156,158/176,178, and the frame 32. A bolt-on upper bracket 130 and pivot shaft 112 combination can be installed on the knuckle 162. Specifically, the pivot shaft 112 can first be inserted rearward through a press-fit portion 110 from a front of the vehicle 10. The upper bracket 130 can then be attached to a complementary portion of the knuckle 162 with a pair of bolts 120 inserted from a top surface of the knuckle 162 substantially perpendicular to a third bolt 120 inserted through a front surface. Subsequently, the knuckle end 154B of the upper A-arm 154 can be positioned between ears of the upper bracket 130 and secured by another bolt 156F. The bolt 156F can have a nut 118 secured thereon to maintain position of the knuckle end 154B of the upper A-arm 154 within the upper bracket 130. The upper lateral link 158 can be secured to the pivot shaft 112 by a nut 114 positioned thereon.

Figure 24:
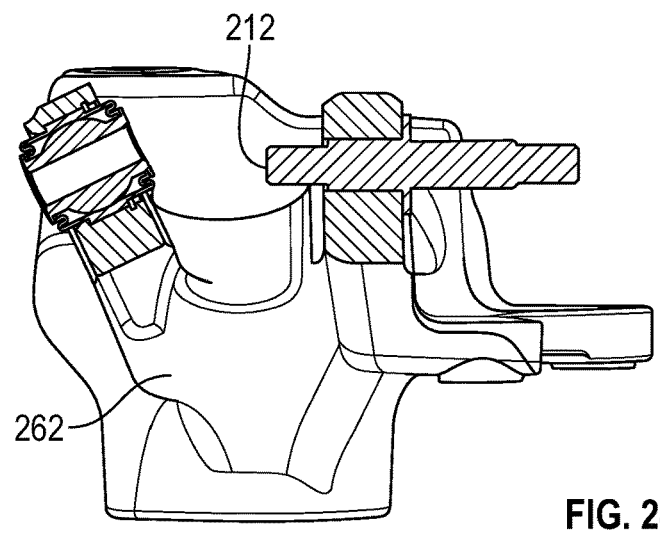
FIG. 24 is a perspective view of an embodiment of the knuckle with a pivot shaft such as an upper arm bolt mount inserted in accordance with the disclosed subject matter.
Figure 25:
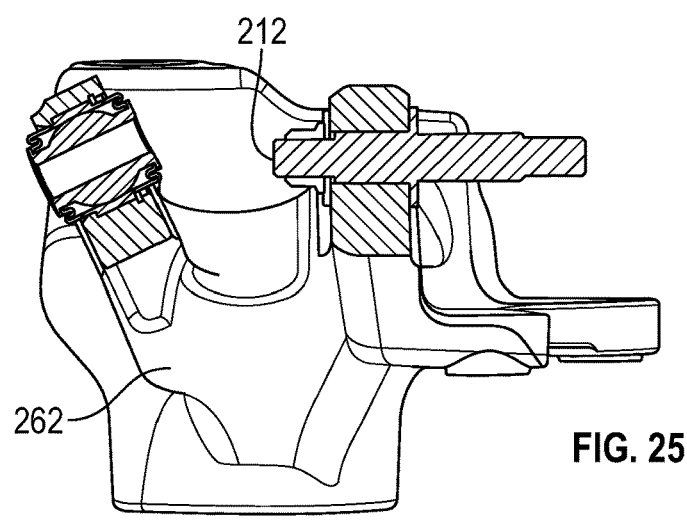
FIG. 25 is a perspective view of the knuckle of FIG. 21 with a pivot shaft attached in accordance with the disclosed subject matter.
Figure 26:
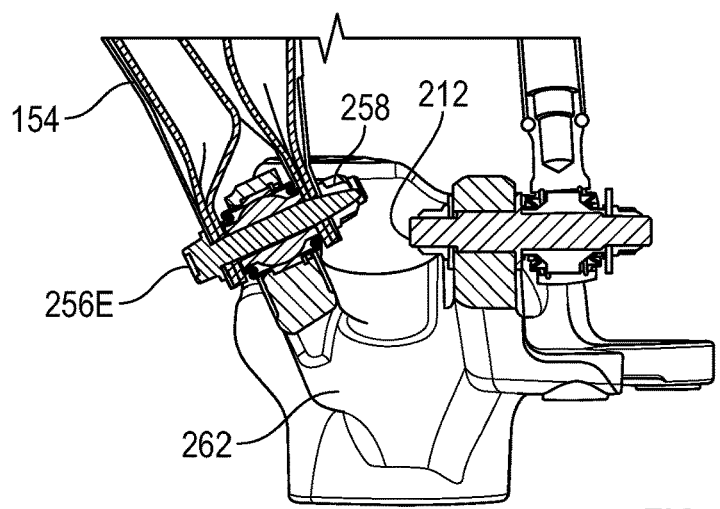
FIG. 26 is a perspective view of the knuckle of FIG. 22 with the upper A-arm and lateral arm connected in accordance with the disclosed subject matter.

Another embodiment is shown in FIGS. 24-26, in which the aforementioned upper bracket 130 is replaced by an integral ear of the knuckle 262. The integral ear configuration allows the upper A-arm 154 to attach to a knuckle 262 without additional structure, reducing weight and complexity. Specifically, a pivot shaft 212 can be inserted forward through a press-fit portion. A shaft safety nut can then be secured onto the forward end of the pivot shaft 212 to hold the pivot shaft 212 in position through the knuckle 262. Subsequently, the knuckle end 154B of the upper A-arm 154 can be secured to a spherical joint that is press fitted to the integral ear of the knuckle 262 and further secured with a clip (similar to 156D of FIG. 11) to the knuckle 262. A bolt 256E and nut 258 can then be inserted therethrough to secure the knuckle end 154B to the press-fit in to the upper A-arm 154. The upper lateral link 158 or 178 can be secured to the pivot shaft 212 by a nut positioned on an opposing side to the shaft safety nut to hold secure the lateral link 158 or 178 in place.

IV. Other Features of the Vehicle

The power source can be an internal combustion engine, an electric motor or a hybrid of an internal combustion engine and an electric motor. The power source (configured as an internal combustion engine or a hybrid power source) can have an engine output axis that is oriented in the longitudinal direction X or in the traverse direction Y of the vehicle. The engine can be mounted forward of the front axles, rearward of the rear axles, or intermediate the front and rear axles. In the exemplary embodiment of FIG. 1, the power source is configured as a longitudinally-oriented, mid-mounted internal combustion engine, and the power source can be mounted at or on at least a rear portion of the frame assembly 32.

The transmission can be an automatic transmission, a manual transmission, or a semi-automatic transmission. The transmission can include an input shaft, an output shaft, and a speed ratio assembly.

The engine and transmission can be contained in the same case and share the same oil. The shared case can permit transfer of power by gears from the crank shaft to the transmission main shaft. The gear receiving power on the transmission main shaft can be connected to a multi-plate wet clutch that can interrupt transmission of power to the transmission main shaft.

The speed ratio assembly of the transmission can connect the transmission input shaft to the transmission output shaft, such that the transmission output shaft can rotate at variable speeds relative to the input shaft. The speed ratio assembly can be a stepped speed ratio assembly or a continuously variable speed ratio assembly configured in any appropriate manner.

The transmission can include a differential gear assembly that can permit one wheel connected to the differential to be driven at a different speed that another wheel connected to the transmission. The differential can be configured in any appropriate manner. The transmission and the differential can be contained in a common housing. This combination of the transmission and the differential can be referred to as a transaxle.

V. Alternative Embodiments

While certain embodiments of the invention are described above, and FIGS. 1-26 disclose the best mode for practicing the various inventive aspects, it should be understood that the invention can be embodied and configured in many different ways without departing from the spirit and scope of the invention.

Exemplary embodiments are intended to include or otherwise cover a frame assembly 32 that can accommodate any number of seats, including one seat, two seats in tandem, two seats spaced in the transverse direction Y, or any other number of seats and seating arrangements.

Embodiments are also intended to include or otherwise cover methods of using and methods of manufacturing the frame and suspension assemblies disclosed above. The methods of manufacturing include or otherwise cover processors and computer programs implemented by processors used to design various elements of the frame and suspension disclosed above. For example, embodiments are intended to cover processors and computer programs used to design the frame and configurations of suspension assemblies that the vehicle can accommodate.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A suspension assembly of a vehicle having a frame, an engine and at least one driven wheel, the vehicle being drivable in forward and rearward directions, the suspension assembly comprising:
   a trailing arm having first and second ends and configured to extend from the frame at the first end;
   a knuckle connected to the second end of the trailing arm and configured to support the at least one driven wheel;
   an arm assembly configured to extend from the frame to support the knuckle and facilitate translational movement of the knuckle relative to the frame in at least one predetermined direction;
   a damper configured to extend from the frame and connected to the trailing arm;
   a connecting link connected to the trailing arm rearward of the damper; and
   a stabilizer bar connected to the connecting link and extending rearward around the engine.

2. The suspension assembly of claim 1, wherein the trailing arm is straight and substantially rectangular in cross-section, and is connected to the knuckle by a spherical joint.

3. The suspension assembly of claim 1, wherein the arm assembly comprises:
   an upper arm being substantially A-shaped and configured to extend from the frame and connected to the knuckle;
   a first lateral arm configured to extend substantially laterally from the frame and connected to the knuckle; and
   a second lateral arm configured to extend substantially laterally from the frame and connected to the knuckle, the second lateral arm disposed below the first lateral arm.

4. The suspension assembly of claim 3, wherein a first leg of the upper arm is configured to extend rearward from the frame to the knuckle and a second leg of the upper arm is configured to extend substantially laterally from the frame to the knuckle, the first leg having a greater length than the second leg.

5. The suspension assembly of claim 4, wherein the upper arm is disposed above both the trailing arm and the second lateral arm, and the first leg of the upper arm is configured to extend substantially along the trailing arm and the second leg of the upper arm is configured to extend substantially along the second lateral arm.

6. The suspension assembly of claim 5, wherein the first leg and the second leg of the upper arm are each connected to the frame by spherical joints.

7. The suspension assembly of claim 1, wherein the trailing arm includes a mount to which both the damper and the connecting link are connected.

8. The suspension assembly of claim 7, wherein the mount is disposed between the first and second ends of the trailing arm.

9. The suspension assembly of claim 1, further comprising another connecting link to which the stabilizer bar is also connected, the another connecting link disposed on an opposite side of the vehicle from the connecting link such that the stabilizer bar spans across a rear of the engine between the connecting link and the another connecting link.

10. The suspension assembly of claim 9, further comprising another trailing arm to which the another connecting link is connected, the another trailing arm being disposed on the opposite side of the vehicle from the trailing arm.

11. A vehicle having an engine and at least one driven wheel, the vehicle being drivable in forward and rearward directions and comprising:
 a frame assembly; and
 a suspension assembly comprising:
  a trailing arm having first and second ends and configured to extend from the frame at the first end;
  a knuckle connected to the second end of the trailing arm and configured to support the at least one driven wheel;
  an arm assembly configured to extend from the frame to support the knuckle and facilitate translational movement of the knuckle relative to the frame in at least one predetermined direction;
  a damper configured to extend from the frame and connected to the trailing arm; and
  a connecting link connected to the trailing arm at a location on the trailing arm that is rearward of the damper and the location is closer to the damper than to the knuckle.

12. The vehicle of claim 11, wherein the trailing arm is straight and substantially rectangular in cross-section, and is connected to the knuckle by a spherical joint.

13. The vehicle of claim 11, wherein the arm assembly comprises:
 an upper arm being substantially A-shaped and configured to extend from the frame and connected to the knuckle;
 a first lateral arm configured to extend substantially laterally from the frame and connected to the knuckle; and
 a second lateral arm configured to extend substantially laterally from the frame and connected to the knuckle, the second lateral arm disposed below the first lateral arm.

14. The vehicle of claim 13, wherein a first leg of the upper arm is configured to extend rearward from the frame to the knuckle and a second leg of the upper arm is configured to extend substantially laterally from the frame to the knuckle, the first leg having a greater length than the second leg.

15. The vehicle of claim 14, wherein the upper arm is disposed above both the trailing arm and the second lateral arm, and the first leg of the upper arm is configured to extend substantially along the trailing arm and the second leg of the upper arm is configured to extend substantially along the second lateral arm.

16. The vehicle of claim 15, wherein the first leg and the second leg of the upper arm are each connected to the frame by spherical joints.

17. The vehicle of claim 11, wherein the trailing arm includes a mount to which both the damper and the connecting link are connected.

18. The vehicle of claim 17, wherein the mount is disposed between the first and second ends of the trailing arm.

19. The vehicle of claim 11, further comprising:
 another connecting link disposed on an opposite side of the vehicle from the connecting link and connected to another trailing arm disposed on the opposite side of the vehicle from the trailing arm; and
 a stabilizer bar connected to the connecting link and the another connecting link that extends rearward around the engine such that the stabilizer bar spans across a rear of the engine between the connecting link and the another connecting link.

20. A suspension assembly of a vehicle defining a vehicle body and having an engine, the suspension assembly comprising:
 a knuckle supporting a wheel;
 a trailing arm extending rearward from the vehicle body and connected to the knuckle;
 an upper arm extending in a vehicle width direction from the vehicle body and connected to the knuckle;
 a lower arm extending in the vehicle width direction from the vehicle body and connected to the knuckle below the upper arm;
 a control arm extending both rearward and in the vehicle width direction from the vehicle body, arranged above the trailing arm and connected to the knuckle;
 a damper extending downward from the vehicle body and connected to the trailing arm; and
 a stabilizer bar connected to the trailing arm and extending in the vehicle width direction behind the engine.

* * * * *